(12) United States Patent
Ogram

(10) Patent No.: US 7,852,240 B2
(45) Date of Patent: Dec. 14, 2010

(54) VARIABLE LENGTH ENCRYPTION

(76) Inventor: Mark Ellery Ogram, 780 S. Freeman Rd., Tucson, AZ (US) 85748

(*) Notice: Subject to any disclaimer, the term of this patent is extended or adjusted under 35 U.S.C. 154(b) by 0 days.

(21) Appl. No.: 12/387,414

(22) Filed: May 1, 2009

(65) Prior Publication Data
US 2010/0277352 A1 Nov. 4, 2010

(51) Int. Cl.
*H03M 7/40* (2006.01)
(52) U.S. Cl. .......................... 341/66; 713/150
(58) Field of Classification Search ............... 341/50, 341/51, 66, 67, 65; 713/1, 150
See application file for complete search history.

(56) References Cited

U.S. PATENT DOCUMENTS

| | | | | |
|---|---|---|---|---|
| 5,136,290 A * | 8/1992 | Bond et al. | .................... | 341/67 |
| 5,533,051 A * | 7/1996 | James | ........................ | 375/240 |
| 5,600,726 A * | 2/1997 | Morgan et al. | .............. | 713/164 |
| 7,171,552 B1 * | 1/2007 | Bell | ........................... | 713/150 |
| 7,457,415 B2 * | 11/2008 | Reitmeier et al. | ........... | 380/210 |

\* cited by examiner

*Primary Examiner*—Peguy JeanPierre
(74) *Attorney, Agent, or Firm*—Mark Ogram

(57) ABSTRACT

A communication system using two computers. The first computer takes a textual string in the open, and, using a varying length representation, associates each character within the textual string to a varying length digital representation. The resulting digital string is then broken into prescribed lengths and the resulting character string is communicated to a second computer. The second computer breaks the character string into the underlying bit map and converts back to the textual string in the open using the varying length representation.

17 Claims, 5 Drawing Sheets

ENCRYPTION

FIG. 1

| ORDER | LETTER | DIGITAL MORSE CODE | SHIFTED MORSE CODE (2) | NEG. MORSE CODE |
|---|---|---|---|---|
| 1 | A | 10100 | 1101011001 | 010011 |
| 2 | B | 110101010100 | 110101010100 | 001010101011 |
| 3 | C | 11010110100 | 11010110100 | 00101001011 |
| 4 | D | 1101010100 | 1101010100 | 0010101011 |
| 5 | E | 100 | 100 | 011 |
| 6 | F | 10101101000 | 10101101000 | 01010010111 |
| ... | ... | ... | ... | ... |
| 15 | O | 110110110100 | 110110110100 | 001001001011 |
| ... | ... | ... | ... | ... |
| 26 | Z | 1101101010100 | 1101101010100 | 0010010101011 |

FIG. 2A USING STRAIGHT DIGITAL MORSE CODE

```
         20
        /       C  ~21A      A  ~21B     T  ~21C
IN THE OPEN ~21  110101 0100   101100      1100
VARIABLE LENGTH
                 20A            20B         20C

GROUPED-ASCII ~22   1101011 0100101 1001100 000000
```

FIG. 2B USING MODIFIED (SHIFT 2) DIGITAL MORSE CODE

```
         20
        /         C  ~23A       A(->C) ~23B     T(->X) ~23C
IN THE OPEN ~23   11010101 00   110101010       101010100
VARIABLE LENGTH
                     23

GROUPED-ASCII ~24  1101011-0100110-101010-0101010-0110000
```

ENCRYPTION

DECRYPTION

VARIABLE LENGTH ENCRYPTION

BACKGROUND

This invention relates generally to encryption and more specifically to encryption using digital mechanisms.

The ability to securely communicate with another person is becoming an ever pressing need. Communications between attorneys/clients, bankers/depositors, health providers/patients, financial advisors/investors, and many more are becoming much more sensitive. Even communications between family members as to their travels, when left "in the open" have put family members are risk from criminal elements.

A large number of commercially available encryption and communication protection mechanisms have been developed in an effort to provide the security required in modern times. These encryption techniques are often difficult to use and all too often easily cracked by interlopers, whether these interlopers are criminals, industrial spies, or foreign governments seeking weaknesses in the U.S. infrastructure which can be used in the case of war or terrorism.

The need for security continues to climb. It is clear there is a need for heighten encrypting capabilities.

SUMMARY OF THE INVENTION

The invention creates a communication system using two computers. While the present invention uses the term "computers" it is not intended to be so limited. The invention is applicable to any two electronic apparatus, whether programmable or hard wired. Such processing units or computers are described in U.S. Pat. No. 7,519,985, entitled "Radio Communication System Radio Communication Control Apparatus, Radio Communication Control Method, Recording Medium, and Computer Program" issued to Kawamura, et al. on Apr. 14, 2009; U.S. Pat. No. 7,519,802, entitled "System and Method for Configuring a Computer System" issued to Wheeler, et al. on Apr. 14, 2009; and, U.S. Pat. No. 7,519,745, entitled "Computer System, Control Apparatus, Storage System and Computer Device" issued to Hashimoto on Apr. 14, 2009, all of which are incorporated hereinto by reference.

While the term "computers" is often used to indicate a traditional computing device, the invention includes any digital apparatus such as: cell phones, electronic control mechanisms, and digital measuring apparatus.

These processing units are in communication with each other, whether that communication is via radio waves, the Internet, hard-wired, or any other technique obvious to those of ordinary skill in the art. Examples of communications mechanisms are described in: U.S. Pat. No. 7,519,793, entitled "Facilitating inter-DSP Data Communications" issued to Adbelilah, et al. on Apr. 14, 2009; U.S. Pat. No. 7,519,675, entitled "Method, Apparatus, and Communications Network for Managing Electronic Mail Services" issued to DiGiorgio, et al. on Apr. 14, 2009; U.S. Pat. No. 7,519,657, entitled "Methods for Providing Communications Services" issued to Hodges, et al. on Apr. 14, 2009; and, U.S. Pat. No. 7,516,246, entitled "Communications Channel Method for Verifying Integrity of Untrusted Subsystem Response to a Request" issued to Condorelli, et al. on Apr. 7, 2009, all of which are incorporated hereinto by reference.

Within this context, the first computer takes a textual string in the open A textual string in the open is a communication which is readable as is. Examples of such items are: e-mail, data/messages on a computer, remote automatic reports, control signals/directions for remote electronic mechanisms, and many more obvious to those of ordinary skill in the art.

Using a varying length representation, the textual string in the open is mapped, character by character, to a varying length digital representation. A varying length representation is any mapping system which uniquely identifies a specific alphanumeric character or control using a representation which is not fixed in length. An example of a varying length representation is the Morse Code.

Morse Code is well known in the art and is utilized in: U.S. Pat. No. 6,822,584, entitled "Morse Code Key Using a Strain Gauge" issued to Scheib on Nov. 23, 2004; U.S. Pat. No. 6,418,323, entitled "Wireless Mobile Phone with Morse Code and Related Capabilities" issued to Bright et al. on Jul. 9, 2002; and, U.S. Pat. No. 5,095,179, entitled "Extensive Morse Code Processing System" issued to Ho on Mar. 10, 1992, all of which are incorporated hereinto by reference.

As example, the following digital table is drawn from the Morse Code (where a dit is made by a "10" and a dash is a "110" and "00" is used to break letters):

A 101100
B 1101010100
C 1101100
D 1101010 etc. Those of ordinary skill in the art readily recognize any number of such mappings which are possible. The key to the mapping is that a specific character maps to a unique digital representation, which is not uniform in length.

Compare this to the ASCII representations which require that all characters have the same number of bits therein.

The digital string formed by mapping the textual string to the associated varying length representation is broken into standard lengths for the creation of characters typically associated with computers (e.g. seven bits for ASCII characters) to form a traditional character string (e.g. ASCII). The resulting character string is communicated to a second computer. As noted earlier, this communication extends from radio waves, to Internet, to hardwired.

Those of ordinary skill in the art readily recognize the ASCII coding system. They are described in detail in: U.S. Pat. No. 7,394,409, entitled Method of Doing Pack ASCII zSeries Instructions" issued to Rajendran, et al. on Jul. 1, 2008; U.S. Pat. No. 6,760,477, entitled "Method and Apparatus for Entering Data Strings Including Hangul (Korean) and ASCII Characters" issued to Ko on Jul. 6, 2004; and U.S. Pat. No. 5,218,458, entitled "ASCII to ASCII Transfer Using FAX Protocol" issued to Kochis, et al. on Jun. 8, 1993, all of which are incorporated hereinto by reference.

Alternatively, the resulting encrypted string is stored for later use. Such storage mechanisms are well known in the art and include U.S. Pat. No. 7,519,786, entitled "Storage System, Storage Access Restriction Method and Computer Program Product" issued to Sekine, et al. on Apr. 14, 2009, incorporated hereinto by reference.

The second computer reverses the process by breaking the character string (e.g. ASCII) into the underlying bit map which is then converted to the textual string in the open using the map from the varying length representations.

In this manner, the encrypted message is not representative of the underlying text. The number of characters within the original message cannot be mapped to any specific encrypted character because of the varying length used in the encryption, and, the infinite possible varying length maps available.

To further heighten the difficulty with which the interloper is faced, some embodiments of the invention permit the use of PIN from the sender which is used to shift the "start" for the mapping function. As example, if the PIN used is the number 4, then, again using the Morse Code example of above, for the first character a potential "A" would be represented by:

101100 (a digital representation for an "A" in Morse Code)

and carried through for the entire alpha numeric series. The start for the mapping for the second character from the message in the open would be moved four characters down to what had previously been an "E":

100 (the new shifted digital representation for an "A", formerly an "E") and carried through for the entire alpha numeric series. The start for the mapping for the third character from the message in the open would then be moved down four characters to the encryption formerly used for an "I":

10100 (the new shifted digital representation for an "A": formerly an "I") etc. In this manner, the pin denotes the movement through the variable length encryption table, rotating through the entire alphanumeric series and then back on itself in a loop fashion.

Even if the variable length map is known, the interloper must know the PIN, otherwise the code cannot be broken because the map dynamically changes for each character, In yet another embodiment, the PIN not only moves the start point along the varying length map, but, actually reverses the code. As example, the software controlling the encryption in this embodiment recognizes that if the PIN is a prime number, then the map changes to the mirror image of the original. As example, when the PIN entered is "7" (a prime number), then while the map indicates that the varying length for an "A" is typically (for the Morse Code example):

101100 the map should be a mirrored (reverse) image, an "A" is now:

001101

In yet another embodiment, the PIN is able to form a negative of the original map. As example, the software controlling the encryption and decryption may identify a PIN greater than "100" as indicating that the varying length map should be formed in the negative. Whereas an "A" is typically (for the Morse Code example):

101100 when the PIN is greater than 100, then the negative is formed, making the "A" for the Morse Code example:

010011

In yet another embodiment, the mapping turns "negative" each time that the start point passes the original start point, thereby forming a Mobius Strip type of arrangement in that the "loop" of the above example is now twisted from the "positive" form to the "negative" form.

Those of ordinary skill in the art readily recognize that any number of permutations are possible and can be triggered by any chosen PIN configuration.

As a more specific example of the preferred embodiment's system, the first computer utilizes an input device configured to receive a textual string in the open. Such a device is well known to those of ordinary skill in the art and includes: a keypad, a memory (e.g. Random Access Memory, magnetic tape, removable diskettes, and bubble memory), a communications portal, and a variety of other mechanisms which permit the textual string to be garnered.

The term "in the open" is well known to those of ordinary skill in the art and relates to the fact that the textual string is not protected or encrypted.

The in the open textual string is then used by a processing unit such as a microprocessor, computer, or a data processing unit well known to those of ordinary skill in the art. The processing unit utilizes a table of varying length representations. This table associates/maps each character within the textual string in the open to a varying length digital representation. As noted above, one such example of a varying length representation is the Morse Code, but, any other such code or permutation of the Morse Code is applicable as the varying length representation table/map.

The processing unit translates the textual string into a stream of bits formed using the varying length digital code. This stream of bits is then compartmentalized or segmented in groupings which correspond to an accepted standard, such as ASCII. The groups are then assigned the appropriate alphanumeric character, thereby forming an encrypted message.

The encrypted message is sometimes stored in a memory or communicated to a second/receiving processing unit.

The second processing unit/computer receives the encrypted message via an input device configured to receive such encrypted message and forms a sequence of bits based from the encrypted message. Using the table of variable length digital representation, the processing unit identifies a sequence of characters from said sequence of bits which is the textual string in the open.

The second processing unit is then able to present the decrypted sequence of characters to a user via a screen or is able to store the message in a memory of the second processing unit.

The invention, together with various embodiments thereof will be more fully explained by the accompanying drawings and following descriptions thereof.

DRAWINGS IN BRIEF

FIG. 1 is a table showing three different variable length mapping arrangements based upon Morse Code.

FIG. 2A is a table showing the translation of one word using digital Morse Code.

FIG. 2B is a table showing the translation of one word using a shifting digital Morse Code.

Figure 3A:
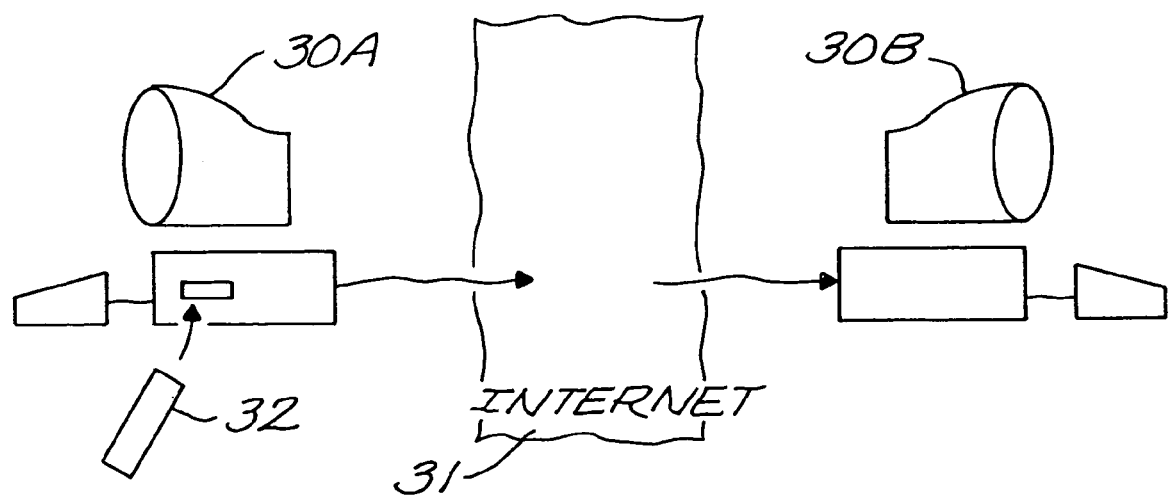
Figure 3B:
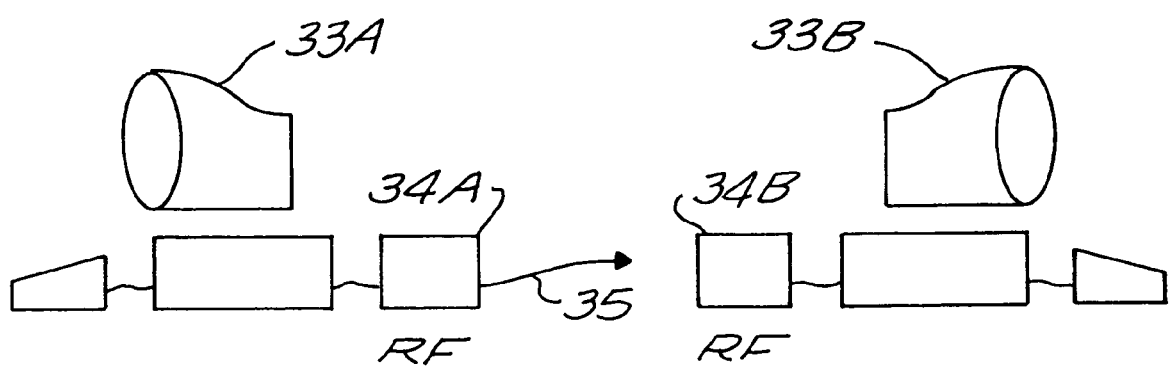
Figure 3C:
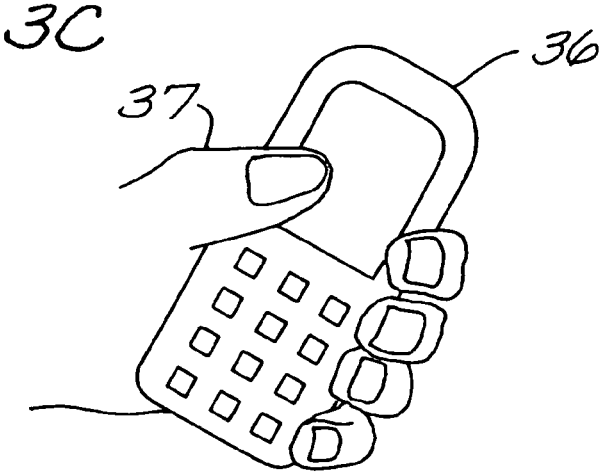

FIGS. 3A, 3B, and 3C illustrate differing embodiments of the encryption/decryption systems.

Figure 4:
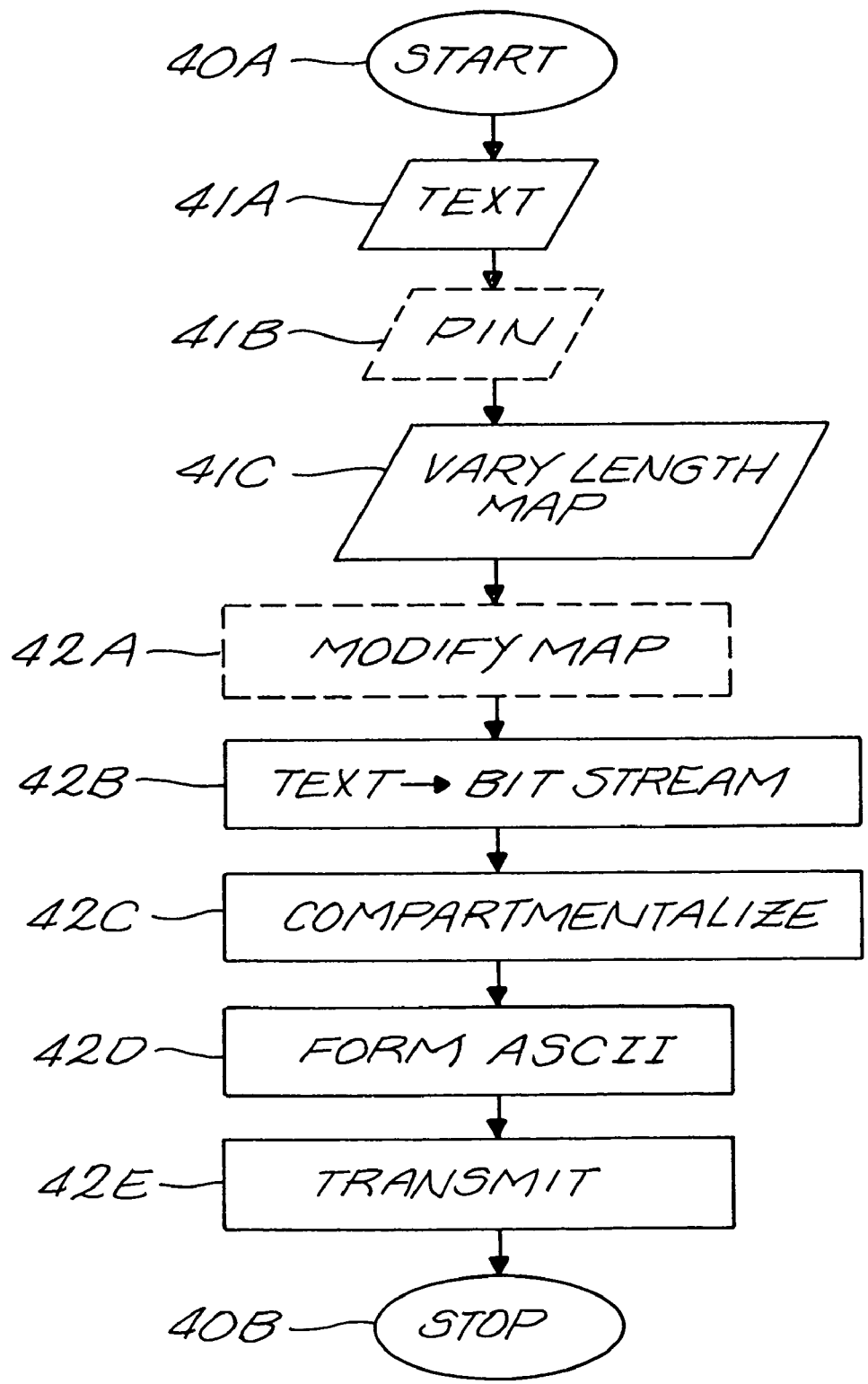

FIG. 4 is a flowchart of the preferred embodiment's encryption methodology.

Figure 5:
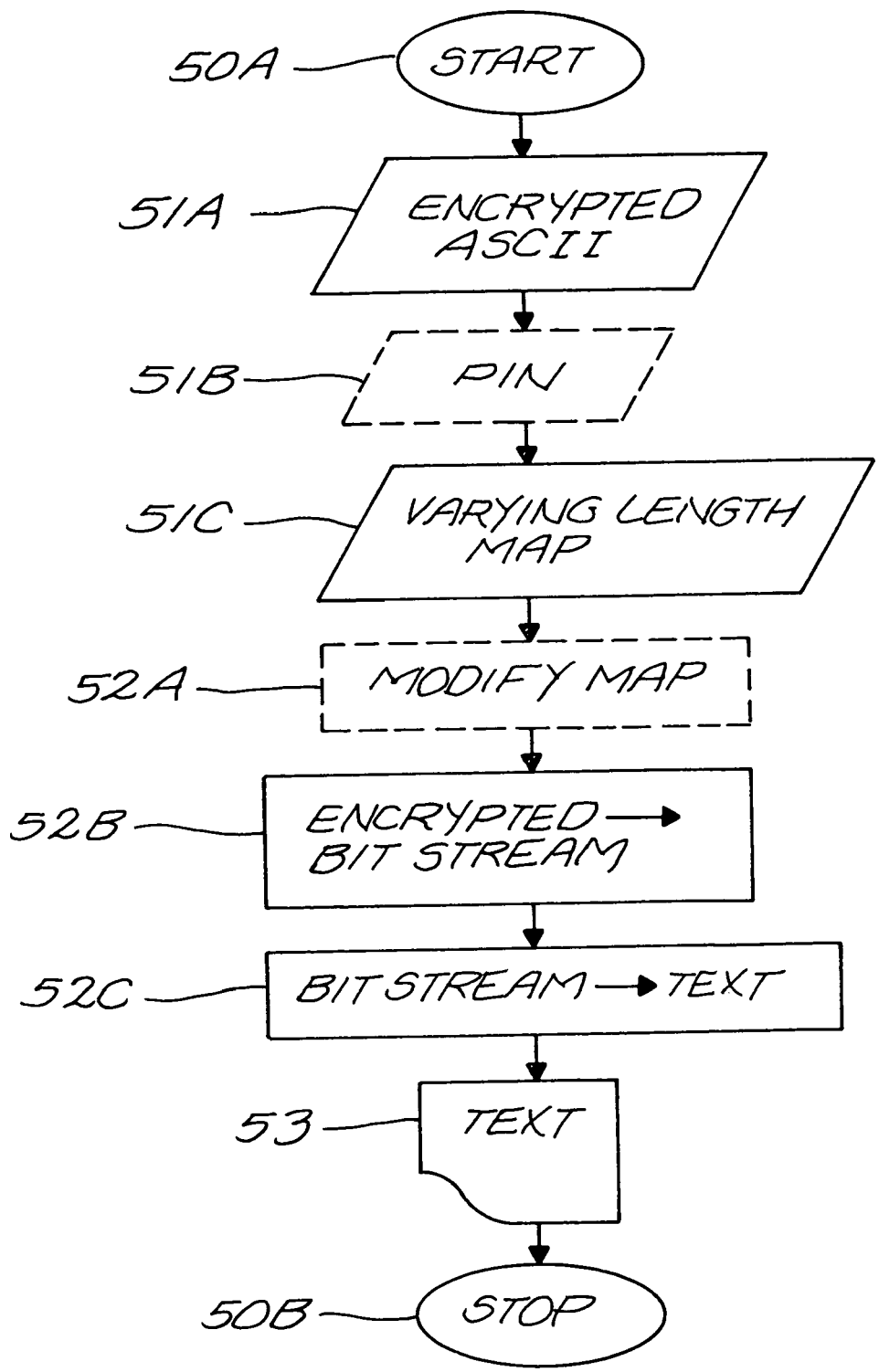

FIG. 5 is a flowchart of the preferred embodiment's decryption methodology.

DRAWINGS IN DETAIL

FIG. 1 is a table showing three different variable length mapping arrangements based upon Morse Code.

As noted earlier, Morse Code is only one of an infinite number of variable length encoding schemes. The actual variable length encoding scheme used is only limited by the imagination of the user; even schemes based upon Morse Code are almost infinite.

In this example, only the letters "A" through "Z" are used for illustration. In their original order 10, each letter within column 11 has an associated digital Morse Code. In this example, a dot is a "1", a dash is a "11", a space between dot/dash is a "0", and the space between the letters is "00". Those of ordinary skill in the art readily recognize that this assignment to create a digital Morse Code is only one of many, including, but not limited to the following:

dot: 110 or 1110 or 11110 etc.

dash 110 or 11110 or 111110 etc.

Using the original assignment for digital Morse Code (dot is "10") then an "A" (dot dash) is digitally "101100" while an "E" (dot) is "100". As is obvious, the digital length for each letter is not uniform.

Further, using the basic digital Morse Code outlined above, the code is optionally "shifted" 13, or moved a set number of places. In this example, the code is shifted two places although any number of positive (forward) or negative (backwards) shifting movements is possible. Once shifted two places, an "A" is digitally a "110101100" (17) instead of "101100" (15).

Shifting of the digital Morse Code provides heightens security because of the changes to the basic Digital Morse code, shifting can also provide an exceptional level of security if it is done after each letter is encrypted.

As example, using the Shifted Morse Code 13, the starting point (order number 1) for the table would be "110101100" for an "A" (17). For the second letter of the message, the starting point (being shifted 2) would now be "100" for an "A" (formerly an "E"); the third letters starting point would be "10101100" (19). The end of the alphabet rotates back onto the first letters to form a looping affect.

This technique is extremely powerful in thwarting a common method for breaking a code by looking for patterns and then "guessing" that the most common pattern found is the most common character in that language. Pattern recognition is not possible since the letter is not encrypted the same each time.

In the preferred embodiment, the shifting of the Code is defined by the PIN that the user identifies in the encrypting process; and similarly by the same PIN used by the receiver in the decrypting process. This PIN, required to be the same for both the encrypting and the decrypting algorithm, is known only to the users and does not have to be stored on the devices whatsoever.

Because the code loops back on itself, the PIN is able to be any integer (positive or negative) or even the numerical equivalent for letters.

In yet another embodiment of the invention, instead of a standard loop as discussed above for shifting the code, a negative version 14 is also available. Sometimes the negative version 14 is used in the standard operation, as outlined identical in operation as the Digital Morse Code 12, while in other embodiments, the negative version 14 is used alternatively with the Digital Morse Code 12.

In this latter embodiment, as the code is shifted 13 (as outlined above), when the start point moves back around to the beginning of the coding sequence (i.e. passes "110101100" (17)), then the code shifts to the negative version 14. When the negative version moves past the original start point "010011" (9), then the map returns to the positive shifted version.

In this manner, the positive shifted version is used part of the time and the negative version (also shifted) is used part of the time, to even further confuse any interloper. This creates a Mobius strip arrangement and is ideally triggered when a specific PIN structure is entered by the users.

FIG. 2A is a table showing the translation of one word using digital Morse Code.

For both FIG. 2A and FIG. 2B, the resulting digital stream is broken or compartmentalized into groupings of seven bits. This is the number of bits used for ASCII.

Referring to FIG. 2A, for this simple example, the word "CAT" is in the open 20 and requires encryption. Using the digital Morse Code outline in FIG. 1, the letters are translated from the "C" (20A) to its variable length digital representation 21A; the "A" (20B) to its variable length digital representation 21B; and, the "T" (20C) to its variable length digital representation 21C. This forms a digital stream 21A, 21B, and 21C which is then compartmentalized or grouped in seven digits groupings 22 (with the last group being filled in with zeros).

Note, the three letters "CAT" are now encrypted into four ASCII representations 22.

Decryption is accomplished by reversing the process.

FIG. 2B is a table showing the translation of one word using a shifting digital Morse Code. The Shifted Morse Code from FIG. 1 is used for this encryption.

Again, the text in the open is "CAT" 20. In this example though, each letter uses a new start point for the map (the loop arrangement described above). After each letter, the start point for the map is moved, in this example, two places: hence, while a "C" uses the original digital sequence 23A, the "A", being the second letter uses a start point associated with a "C" from the map creating a digital stream 23B; "T" in "CAT" uses a map that is shifted four place to get the digital stream 23C.

As before, the digital stream 23A, 23B, and 23C, are compartmentalized/grouped in groupings of seven for form the encrypted ASCII stream 24.

Note that in FIG. 2A the encrypted ASCII constituted four letters for a three character string in the open; using the different map of FIG. 2B, the very same three characters map to five encrypted ASCII characters.

In this way, the PIN used by the users provides a further complex factoring to the encryption to frustrate any interlopers.

FIGS. 3A and 3B illustrate two embodiments of the encryption/decryption systems.

Referring to FIG. 3A, computer 30A communicates with computer 30B via the Internet 31. This communication is any of those obvious to those of ordinary skill in the art, including, but not limited to, e-mail and instant messaging.

Computer 30A receives a message in the open and then encrypts it using the techniques of this invention before communicating the encrypted message to computer 30B which decrypts the message for the user of computer 30B.

In some embodiments of the invention, the message in the open is entered by a user of computer 30A, in other embodiments, memory 32 contains the message in the open which is used by computer 30A. Memory 32 is also used to store the encrypted message in some embodiments of the invention.

While this illustration shows a removable memory 32, the invention is not so limited but is intended to utilize internal memories with computers 30A and 30B as well.

Now referencing FIG. 3B, in this embodiment computer 33A utilizes a radio frequency transmitter 34A to send the encrypted message via a radio signal 35 to radio frequency receiver 34B which communicates the encrypted message to computer 33B.

As noted earlier, the text in the open is encrypted by computer 33A, ideally using a PIN provided by a user of computer 33A. The encrypted message is decrypted by computer 33B, using a PIN from a user of computer 33B.

FIG. 3C illustrates a cellular phone 36 which is employed for either encrypting and sending the message or for decrypting and reading the text in the open. Operator 37 is able to provide the appropriate PIN.

FIG. 4 is a flowchart of the preferred embodiment's encryption methodology.

The program used to configure the computer to perform the encryption is started 40A and the text in the open is obtained 41A. Obtaining the text is via any means obvious to those of ordinary skill in the art, including, but not limited to, input from an operator or drawn from a memory apparatus.

In some embodiments of the invention, a PIN is then obtained 41B. The varying length map is obtained 41C. If the embodiment utilizes a PIN, then the varying length map is modified as defined by the PIN in any of the ways outlined above.

Using the varying length map, the text in the open is converted to a bit stream 42B and then compartmentalized 42C. The now compartmentalized bit stream is used to form an ASCII sequence 42D which is communicated to the remote computer 42E (or stored in memory in some embodiments) and the program stops 40B.

While this flowchart illustrates the preferred embodiment, those of ordinary skill in the art readily recognize a variety of other ways to accomplish the tasks outlined.

FIG. 5 is a flowchart of the preferred embodiment's decryption methodology.

In this embodiment of the decryption methodology, the software which configures the computer to perform tasks, starts 50A and receives the encrypted ASCII text 51A. In the preferred embodiment where a PIN is used to define the variable length map used, the PIN is obtained from the operator.

The variable length map is obtain 51C and, for the preferred embodiment, modified using the pin 52A. The encrypted ASCII is converted to a digital bit stream 52B, and, using the variable length map, the bit stream is converted to text 52C, resulting in the reformation of the text in the open. The text in the open is then displayed 53 (or alternatively stored in memory) and the program stops 50B.

In this approach, the decryption of the message is efficiently performed.

It is clear that the present invention provides a greatly improved encryption methodology and mechanism.

What is claimed is:

1. An encryption system comprising:
    a) an input device configured to receive a textual string in the open; and,
    b) a processing unit configured to:
        1) using a table of varying length representations, associate each character within said textual string in the open to a varying length digital representation,
        2) stream said varying length digital representations into a sequence of digital representations,
        3) compartmentalize said sequence of digital representations into a series of groupings of a set length, and,
        4) for each grouping of a set length, assign a letter, thereby forming an encrypted message.

2. The encryption system according to claim 1, wherein said processing unit is further configured to iteratively:
    a) establish a start point of said table of varying length representations; and,
    b) after each character within said textual string in the open is associated with a varying length digital representation, establish a new start point.

3. The encryption system according to claim 2, wherein said processing unit is further configured to:
    a) receive an identifying value from an operator; and,
    b) based upon said identifying value, establish the start point of said table of varying length representations.

4. The encryption system according to claim 3, wherein said processing unit is further configured to modify said table of varying length representations based upon said identifying value.

5. The encryption system according to claim 3 further including a transmitting unit configured to communicate said encrypted message to a remote computer.

6. The encryption system according to claim 5, wherein said table of varying length representations is based upon Morse Code.

7. A decryption system comprising:
    a) an input device configured to receive an encrypted message being a textual string;
    b) A visual display; and,
    c) a processing unit configured to:
        1) create a sequence of bits based upon said textual string,
        2) using a table of variable length digital representation, identify a sequence of characters from said sequence of bits, and,
        3) communicate said sequence of characters to a user of said processing unit via said visual display.

8. The decryption system according to claim 7, wherein said processing unit is further configured to iteratively:
    a) establish a start point of said table of varying length representations; and,
    b) after each character within said sequence of characters is identified, establish a new start point.

9. The decryption system according to claim 8, wherein said processing unit is further configured to:
    a) receive an identifying value from an operator; and,
    b) based upon said identifying value, establish the start point of said table of varying length representations.

10. The decryption system according to claim 9, wherein said processing unit is further configured to modify said table of varying length representations based upon said identifying value.

11. The decryption system according to claim 10, wherein said table of varying length representations is based upon Morse Code.

12. A communication system comprising:
    a) a first computer having:
        1) an input device configured to receive a textual string in the open,
        2) a processing unit configured to:
            A) using a table of varying length representations, associate each character within said textual string in the open to a varying length digital representation,
            B) stream each of said varying length digital representations into a sequence of digital representations,
            C) compartmentalize said sequence of digital representations into a series of groupings of a set length, and,
            D) for each grouping of a set length, assign a letter, thereby forming an encrypted message; and,
    b) a second computer having:
        1) an input device configured to receive said encrypted message from said first computer,
        2) a visual display, and,
        3) a processing unit configured to:
            A) create a sequence of bits based upon said textual string,
            B) using the table of variable length digital representations, identify a sequence of characters from said sequence of bits, and,
            C) present said sequence of characters to a user of said second computer via said visual display.

13. The communication system according to claim 12,
a) wherein said processing unit of the first computer is further configured to iteratively:
   1) establish a start point of said table of varying length representations, and,
   2) after each character within said textual string in the open is associated with a varying length digital representation, establish a new start point; and,
b) wherein said processing unit of the second computer is further configured to iteratively:
a) establish a start point of said table of varying length representations; and,
b) after each character within said sequence of characters is identified, establish a new start point.

14. The communication system according to claim 13,
a) wherein said processing unit of the first computer is further configured to:
   1) receive an identifying value from an operator of the first computer, and,
   2) based upon said identifying value, establish the start point of said table of varying length representations; and,
b) wherein said processing unit of the second computer is further configured to:
   1) receive the identifying value from an operator of the second computer, and,
   2) based upon said identifying value, establish the start point of said table of varying length representations.

15. The communication system according to claim 14,
a) wherein said processing unit of the first computer is further configured to modify said table of varying length representations based upon said identifying value; and,
b) wherein the processing unit of the second computer is further configured to modify said table of varying length representations based upon said identifying value.

16. The communication system according to claim 15, wherein the first computer further includes a transmitting unit configured to communicate said encrypted message to the second computer.

17. The communication system according to claim 16, wherein said table of varying length representations is based upon Morse Code.

* * * * *